(12) United States Patent
Yang et al.

(10) Patent No.: US 7,453,554 B2
(45) Date of Patent: Nov. 18, 2008

(54) PHASE MEASUREMENT METHOD AND APPLICATION THEREOF

(75) Inventors: Shou-Qing Yang, Hang-Zhou (CN); Yin-Long Luo, Hang-Zhou (CN); Song Li, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/704,840

(22) Filed: Feb. 9, 2007

(65) Prior Publication Data
US 2007/0206176 A1    Sep. 6, 2007

(30) Foreign Application Priority Data
Mar. 2, 2006   (TW) .............. 95106980 A

(51) Int. Cl.
*G01C 3/08* (2006.01)
(52) U.S. Cl. .................. 356/5.1; 356/5.15; 356/4.01
(58) Field of Classification Search ............. 356/3–5.15
See application file for complete search history.

(56) References Cited

U.S. PATENT DOCUMENTS

| | | | | |
|---|---|---|---|---|
| 4,011,562 A | * | 3/1977 | Bruce ................. | 342/46 |
| 5,311,271 A | * | 5/1994 | Hurt et al. ................. | 356/5.1 |
| 6,483,595 B1 | * | 11/2002 | Yakovlev et al. ............ | 356/607 |
| 6,603,536 B1 | * | 8/2003 | Hasson et al. .............. | 356/28.5 |
| 2001/0013697 A1 | * | 8/2001 | Saito et al. ................. | 280/735 |
| 2006/0072025 A1 | * | 4/2006 | Kakumoto et al. .......... | 348/308 |

* cited by examiner

*Primary Examiner*—Thomas H Tarcza
*Assistant Examiner*—Timothy A Brainard
(74) *Attorney, Agent, or Firm*—Thomas, Kayden, Horstemeyer & Risley

(57) ABSTRACT

A phase measurement method is disclosed, which includes inputting a predetermined voltage to the photodiode; receiving an optical signal and transforming into an electrical signal; generating a sampled signal with a signal transforming process; determining whether the amplitude value of the sampled signal in a predetermined range or not; if the amplitude of the sampled signal is not in the predetermined amplitude range, adjusting the predetermined voltage and receiving the optical signal and judging again until the amplitude value falls into the predetermined amplitude range; if the amplitude of the sampled signal is in the predetermined amplitude range, calculating the first phase value; and judging whether the predetermined voltage adjusted or not. If the predetermined voltage has been adjusted, calculating the compensating phase value and the second phase value in accordance with the adjusted predetermined voltage.

20 Claims, 7 Drawing Sheets

PHASE MEASUREMENT METHOD AND APPLICATION THEREOF

RELATED APPLICATIONS

The present application is based on, and claims priority from, Taiwan Application Ser. No. 95106980, filed Mar. 02, 2006, the disclosure of which is hereby incorporated by reference herein in its entirety.

BACKGROUND

1. Field of Invention

The present invention relates to a distance measurement system, and more particularly to a phase measurement method.

2. Description of Related Art

Refer to FIG. 1. FIG. 1 illustrates a conventional phase-shift laser distance measurement system 100. The emitter 10 emits two optical signals T(t) wherein one of the optical signals T(t) is received by the first receiver 20A and another of the optical signals T(t) is emitted to the target object 5 to generate a reflective optical signal received by the second receiver 20B. The optical signal T(t) received by the first receiver 20A is mixed with the mixed signal H(t) to provide a reference signal Ref(t). The reflective optical signal received by the second receiver 20B is mixed with the mixed signal H(t) to provide a target signal Sig(t) wherein the mixed signal H(t) might come from a mixer. The first phase detector 30A detects the phase of the reference signal Ref(t), and the second phase detector 30B detects the phase of the target signal Sig(t). The processing unit 40 calculates the distance between the target object 5 and the measurement system 100 by the phase difference between the reference signal Ref(t) and the target signal Sig(t).

In the prior art, the avalanche photodiode (APD) is used to be the photoelectric converter of the first receiver 20A and the second receiver 20B such that the received optical signal is converted into a corresponding outputted electric signal. However, the luminous intensity received by the avalanche photodiode may vary with ambient conditions, such as the reflection of the target object surface, the distance, the temperature, the atmosphere etc. Therefore, the amplitude of the corresponding outputted electric signal, generated by the light beam signal received by the avalanche photodiode, is too unstable to measure the distance accurately.

SUMMARY

A phase measurement method is provided. The method includes inputting a predetermined voltage to a photoelectric converter; receiving an optical signal and converting the optical signal into an electrical signal; mixing the electrical signal with a mixed signal to provide an output signal; filtering the output signal to generate an IF (Intermediate Frequency) signal; sampling the IF signal to generate a sampled signal; determining whether the amplitude value of the sampled signal falls within the predetermined amplitude range or not; adjusting the predetermined voltage and re-receiving the optical signal until the amplitude value falls within the predetermined amplitude range when the amplitude value does not fall within the predetermined amplitude range; calculating a first phase value in accordance with the sampled signal when the amplitude value falls within the predetermined amplitude range; determining whether the predetermined voltage is adjusted or not; calculating the compensating phase value in accordance with the adjusted predetermined voltage when the predetermined voltage has been adjusted; and summing the first phase value and the compensating phase value to generate a second phase value.

A phase measurement circuit including a receiver and a feedback calculator is provided wherein the receiver has a photoelectric converter. The photoelectric converter in the receiver receives an optical signal and converts the optical signal into an electrical signal. The electrical signal is mixed with a mixed signal, generated by a mixer, to generate an output signal wherein the photoelectric converter is in a reverse bias with the predetermined voltage. The feedback calculator calculates a sampled signal with an amplitude value in accordance with the output signal. When the amplitude value does not fall within the predetermined amplitude range, adjusting the predetermined voltage to make the receiver re-receive the optical signal until the amplitude value falls within the predetermined amplitude range; when the amplitude value falls within the predetermined amplitude range, calculating a first phase value in accordance with the sampled signal and compensating the phase value in accordance with whether the predetermined voltage has been adjusted or not.

A distance measurement system including an emitter, a first phase measurement circuit and a second phase measurement circuit is provided. The emitter emits a reference signal to the first phase measurement circuit and emits an optical signal to the target object. The first phase measurement circuit receives the reference signal to calculate a first phase value. The second phase measurement circuit receives the optical signal reflected by the target object to calculate a second phase value. Therefore, the distance between the distance measurement system and the target object is calculated in accordance with the phase difference between the first phase value and the second phase value.

The second phase measurement circuit includes a receiver and a feedback calculator wherein the receiver has a photoelectric converter. The receiver is operable to receive the optical signal and convert into an electrical signal. The electrical signal is mixed with a mixed signal to generate an output signal wherein the predetermined voltage initially supplies the photoelectric converter. The feedback calculator calculates a sampled signal with an amplitude value in accordance with the output signal. When the amplitude value does not fall within the predetermined amplitude range, adjusting the predetermined voltage to make the receiver re-receive the optical signal until the amplitude value falls within the predetermined amplitude range; when the amplitude value falls within the predetermined amplitude range, calculating a third phase value in accordance with the sampled signal and compensating the phase value in accordance with whether the predetermined voltage is adjusted or not.

The feedback calculator calculates a second phase value in accordance with the third phase value and the compensating phase value. Therefore, the distance between the distance measurement system and the target object is calculated by the phase difference between the first phase value and the second phase value.

These and other embodiments, aspects and features of the invention will be better understood from a detailed description of the embodiments of the invention, which are further described below in conjunction with the accompanying Figures.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
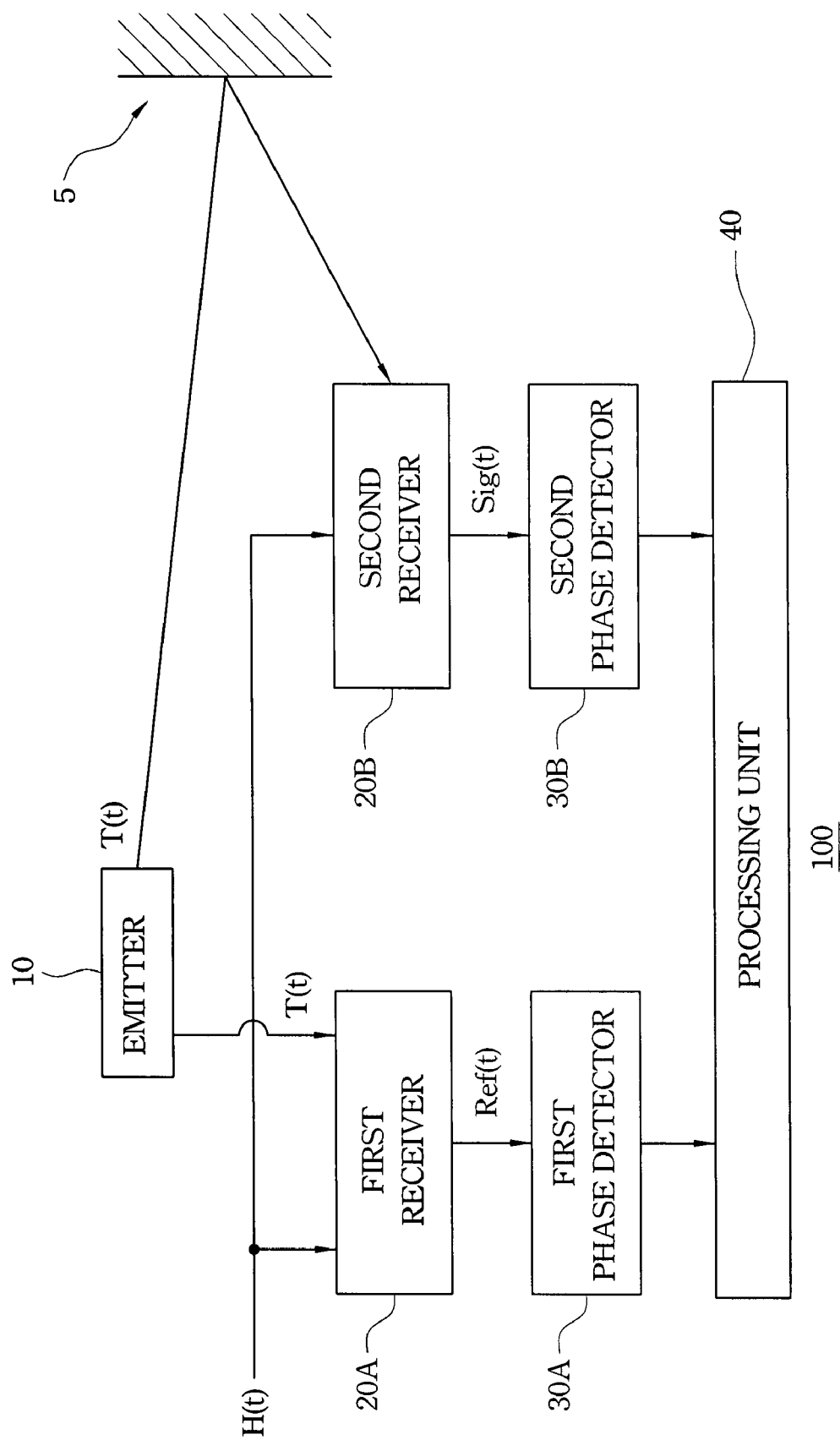
FIG. 1 is a block diagram of a conventional phase-shift laser distance measurement system.

Reference will now be made in detail to the present preferred embodiments of the invention, examples of which are illustrated in the accompanying drawings. Wherever possible, the same reference numbers are used in the drawings and the description to refer to the same or like parts.

While the specification concludes with claims defining the features of the invention that are regarded as novel, it is believed that the invention will be better understood from a consideration of the following description in conjunction with the figures, in which like reference numerals are carried forward.

Figure 2:
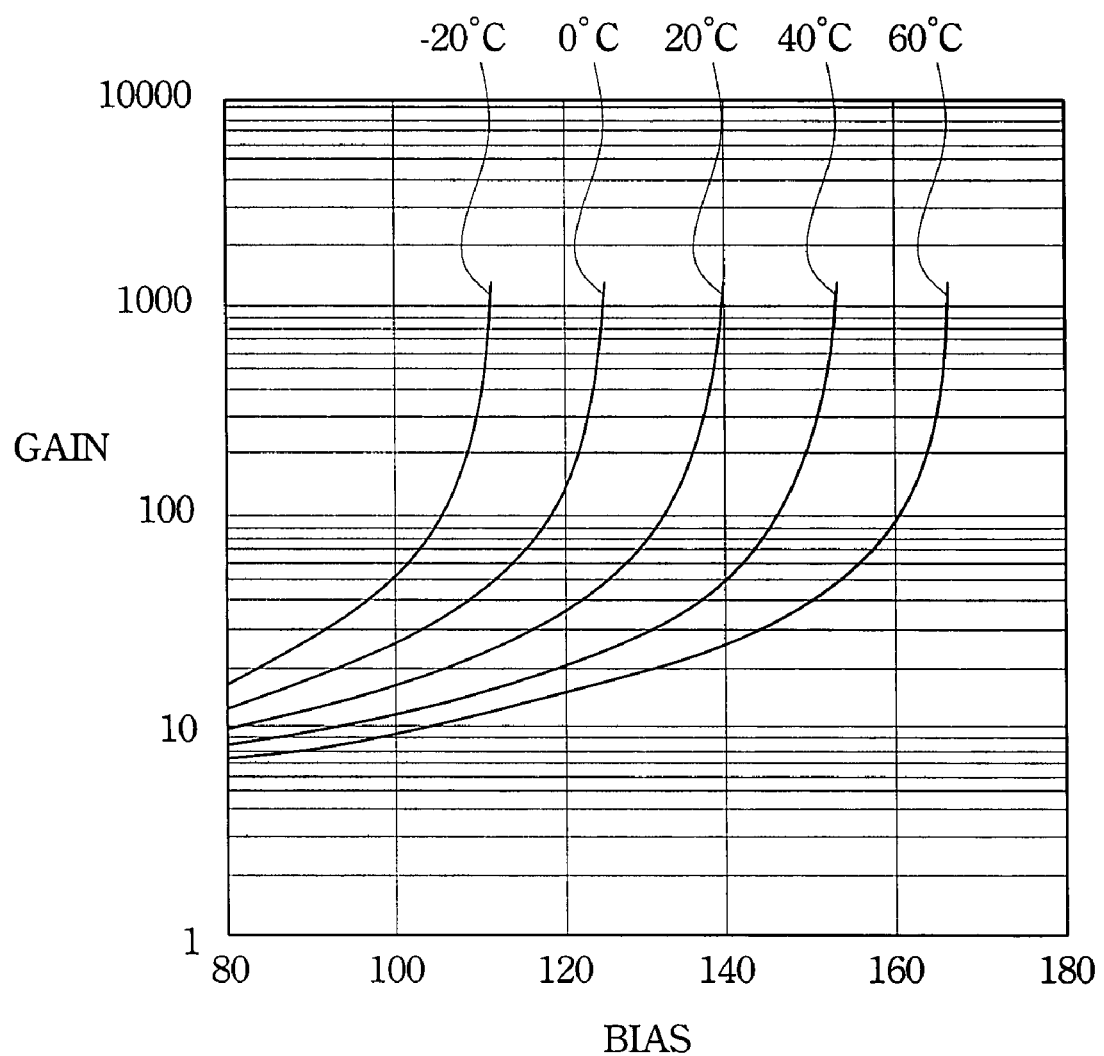
FIG. 2 is a curve chart exhibiting the relationship between the reverse bias and the gain of photoelectric converter under various temperatures.

In general, the photoelectric converter, such as the avalanche photodiode (APD), is served as a receiver of the optical signal transceiver. The photoelectric converter generates a corresponding signal in accordance with the luminous intensity of the received optical signal. A reverse bias is added to the photoelectric converter during the operation. Refer to FIG. 2. The curve chart illustrates the relationship between the reverse bias and the gain of photoelectric converter wherein a higher reverse bias has the larger gain. For example, the avalanche photodiode has a reverse bias range from 80V to 140V. The luminous intensity received by the photoelectric converter may be vary with ambient conditions, such as the reflection of the target object surface, the distance, the temperature, the atmosphere etc. such that an error in measurement may occur. Therefore, the present invention provides method of compensating for the phase variation and adjusting the reverse bias to solve the above problem and carry out an accurate measurement. In addition, the reverse bias of the photoelectric converter is a predetermined voltage in the embodiment.

Figure 3:
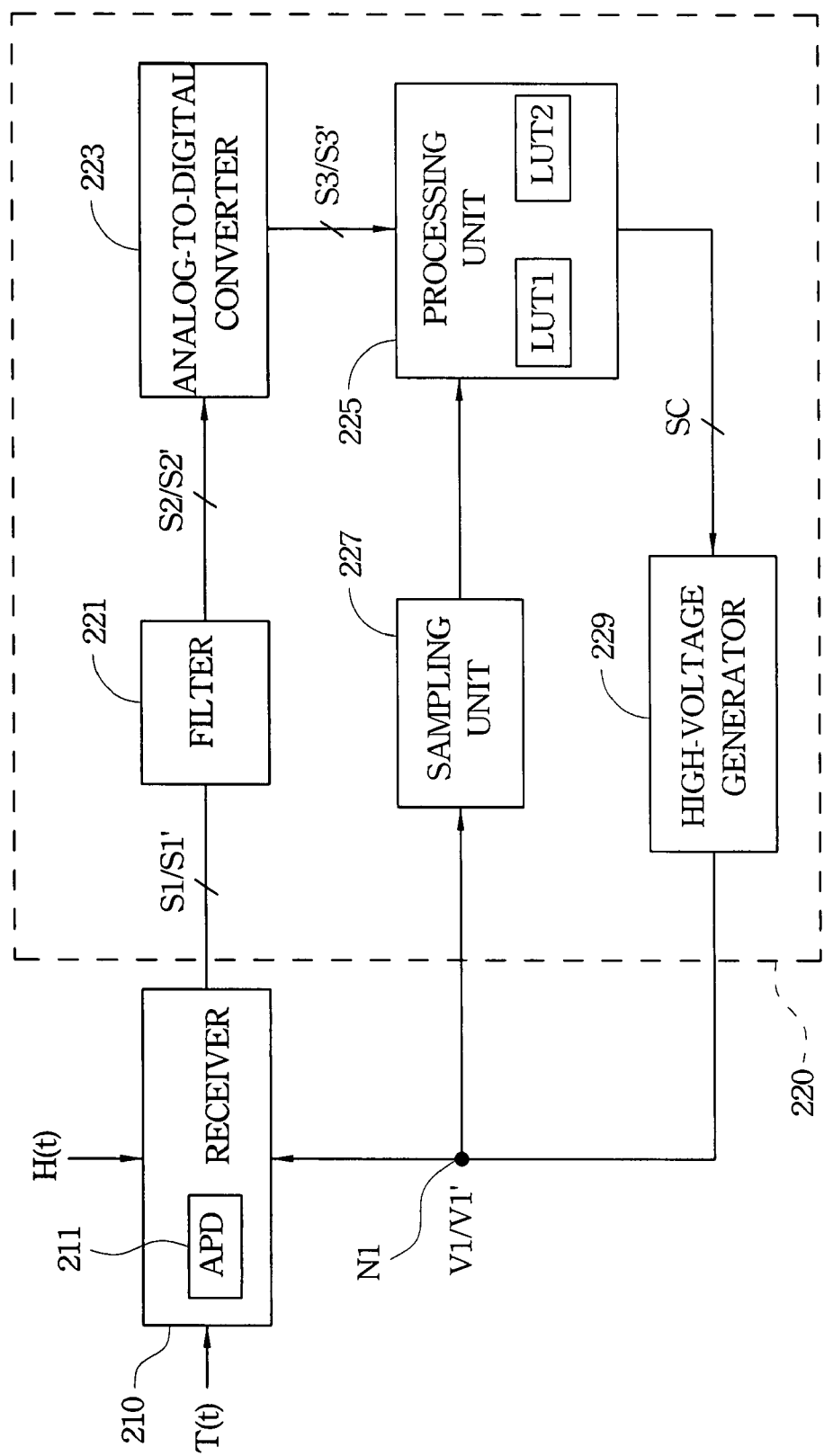
FIG. 3 is block diagram of the embodiment of the phase measurement circuit.

Refer to FIG. 3. FIG. 3 is block diagram of the embodiment of the phase measurement circuit. A phase measurement circuit 200 includes a receiver 210 and a feedback calculator 220. The feedback calculator 220 includes a filter 221, an analog-to-digital converter 223, a processing unit 225, a sample unit 227 and a high-voltage generator 229.

The receiver 210 includes a photoelectric converter 211 to convert a received optical signal T(t) into an electrical signal wherein the received optical signal T(t) is the laser beam signal emitted by an emitter and reflected by an object. Thus, the electrical signal is mixed with a mixed signal H(t) to generate a corresponding output signal S1.

The feedback calculator 220 calculates a sampled signal S3 with an amplitude value in accordance with the output signal S1 from the receiver 210. When the amplitude value of the sampled signal does not fall within the predetermined amplitude range, adjusting the predetermined voltage supplied to the photoelectric converter 211 to make the receiver 210 re-receive the optical signal T(t) until the amplitude value falls within the predetermined amplitude range. When the amplitude value falls within the predetermined amplitude range, calculating a first phase value in accordance with the sampled signal S3 and compensating the phase in accordance with whether the predetermined voltage is adjusted or not. The predetermined amplitude range value for the sampled signal S3 is in the range, but not limited to the range, 0.3V-3.3V. Decreasing the predetermined amplitude range values increases the measurement accuracy but decreases the measurement speed.

The filter 221, a band-pass filter, is coupled with the receiver 210 to filter the output signal S1 generated by the receiver 210 and generates a corresponding IF (Intermediate Frequency) signal S2. The frequency of the mixed signal is the central frequency of the band-pass filter, and the predetermined band is, but not limited to, 2 KHz. The analog-to-digital converter 223 is coupled with the filter 221 to sample the IF signal S2 generated by the filter 221 and generates a corresponding sampled signal S3.

The high-voltage generator 229 is coupled between the processing unit 225 and the receiver 210 to supply the voltage to the photoelectric converter 211 in accordance with the control signal of the processing unit 225. In the embodiment, the high-voltage generator 229 initially supplies a predetermined voltage V1 to the photoelectric converter 211. The sample unit 227 is coupled with the high-voltage generator 229 to sample the outputted voltage from the high-voltage generator 229 and output the sampled voltage value to the processing unit 225.

The processing unit 225 is coupled between the analog-to-digital converter 223 and the high-voltage generator 229 to receive the sampled signal S3 from the analog-to-digital converter 223 and start the phase and gradient calibration so as to generate a corresponding phase value. In the embodiment, the processing unit 225 generates a control signal SC in accordance with the reference list LUT1 and the amplitude value of the sampled signal S3 to make the high-voltage generator 229 adjust the outputted voltage. Thus, the reverse bias of the photoelectric converter 211 is modified to alter the gain. In other words, when the received luminous intensity of the photoelectric converter 211 are varied with the ambient conditions, such as the reflection of the target object surface, the distance, the temperature, the atmosphere etc., the outputted voltage generated by the high-voltage generator 229 is modified to carry out accurate measurement. In addition, the processing unit 225 generates a compensating phase in accordance with the reference list LUT2 and the voltage value of the outputted voltage to compensate the phase difference resulting from the variable reverse bias of the avalanche photodiode 211. There, phase compensation is achieved.

Figure 4:
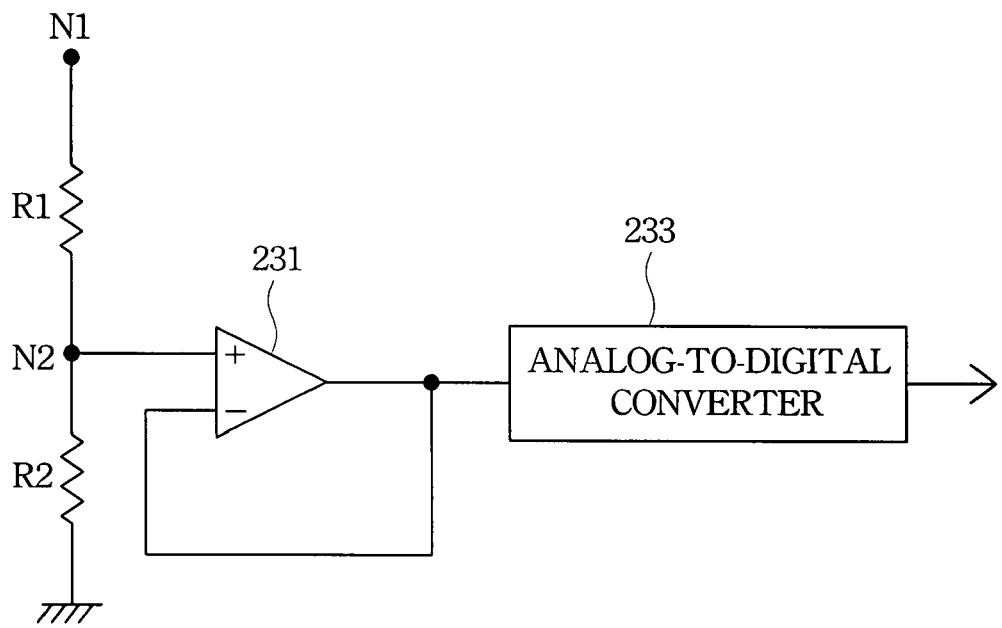
FIG. 4 is a circuit diagram of the embodiment of the sample unit.

Refer to FIG. 3 and FIG. 4. FIG. 4 is a circuit diagram of the embodiment of the sample unit. The sample unit 227 includes a resistance R1, a resistance R2, an operational amplifier 231 and an analog-to-digital converter 233. The sample unit 227 is coupled with a node N1 to receive the voltage supplied to the photoelectric converter 211. The resistance R1 and the resistance R2 are cascaded between the node N1 and the ground.

The operational amplifier 231 includes a non-negative input, a negative input, and an output wherein the non-negative input is coupled with a node N2 and the negative input is coupled with the output of the operational amplifier 231. The analog-to-digital converter 233 is coupled between the output of the operational amplifier 231 and the processing unit 225 to output the sampled voltage signal.

Figure 5:
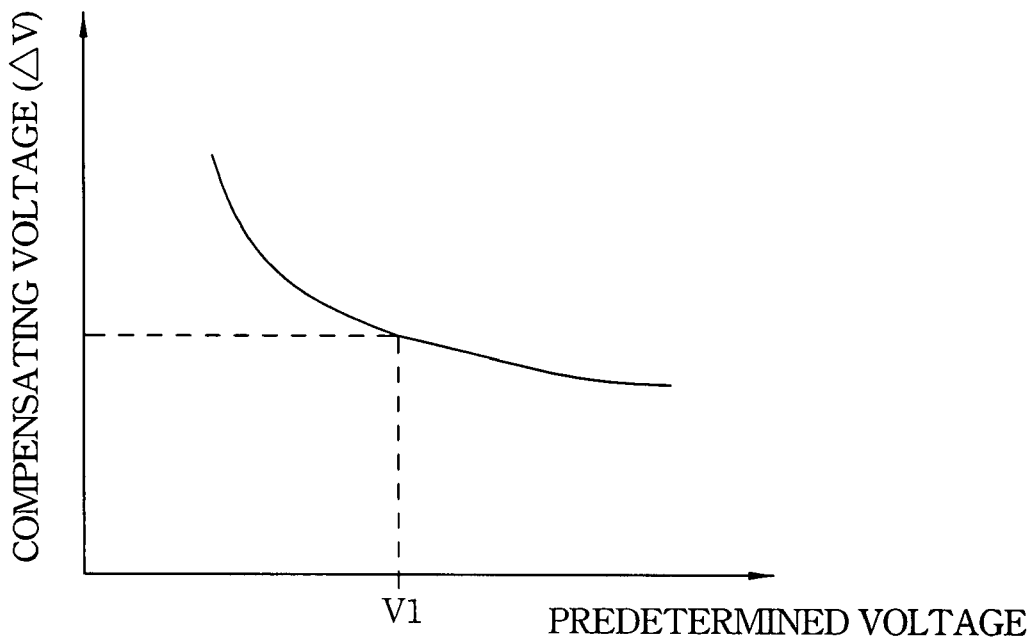
FIG. 5 is a curve chart exhibiting the relationship between the predetermined voltage and the compensating voltage of the avalanche photodiode.
Figure 6:
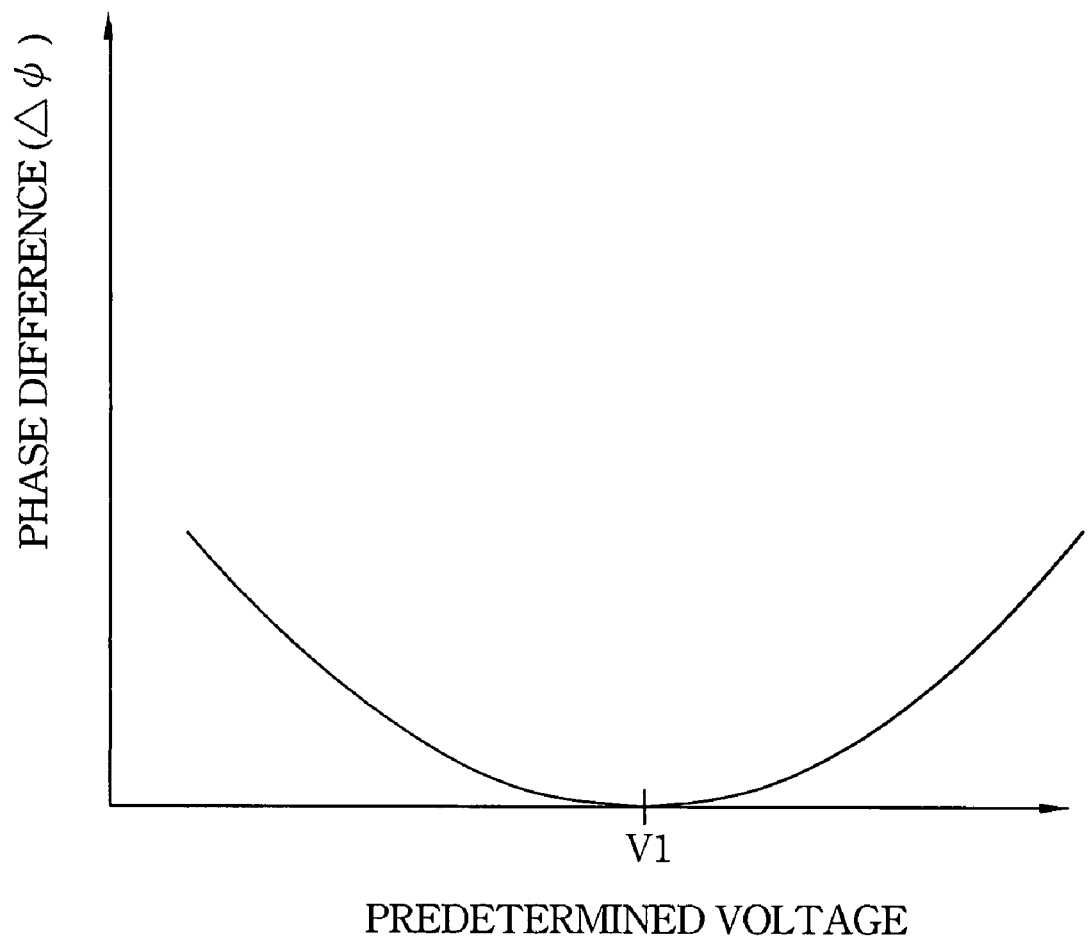
FIG. 6 is a curve chart exhibiting the relationship between the predetermined voltage and the compensating phase value of the avalanche photo diode.

Refer to FIG. 5, the reference list LUT1 shows the relationship between the predetermined voltage and the compensating voltage in the photoelectric converter 211. Refer to FIG. 6, the reference list LUT2 shows the relationship between the predetermined voltage and phase difference in the photoelectric converter 211. In this embodiment, the reference list LUT1 and the reference list LUT2 are stored in, but not limited in, the processing unit 255. However, the reference list LUT1 and the reference list LUT2 can be stored in other memory units out of the processing unit 225.

Figure 7:
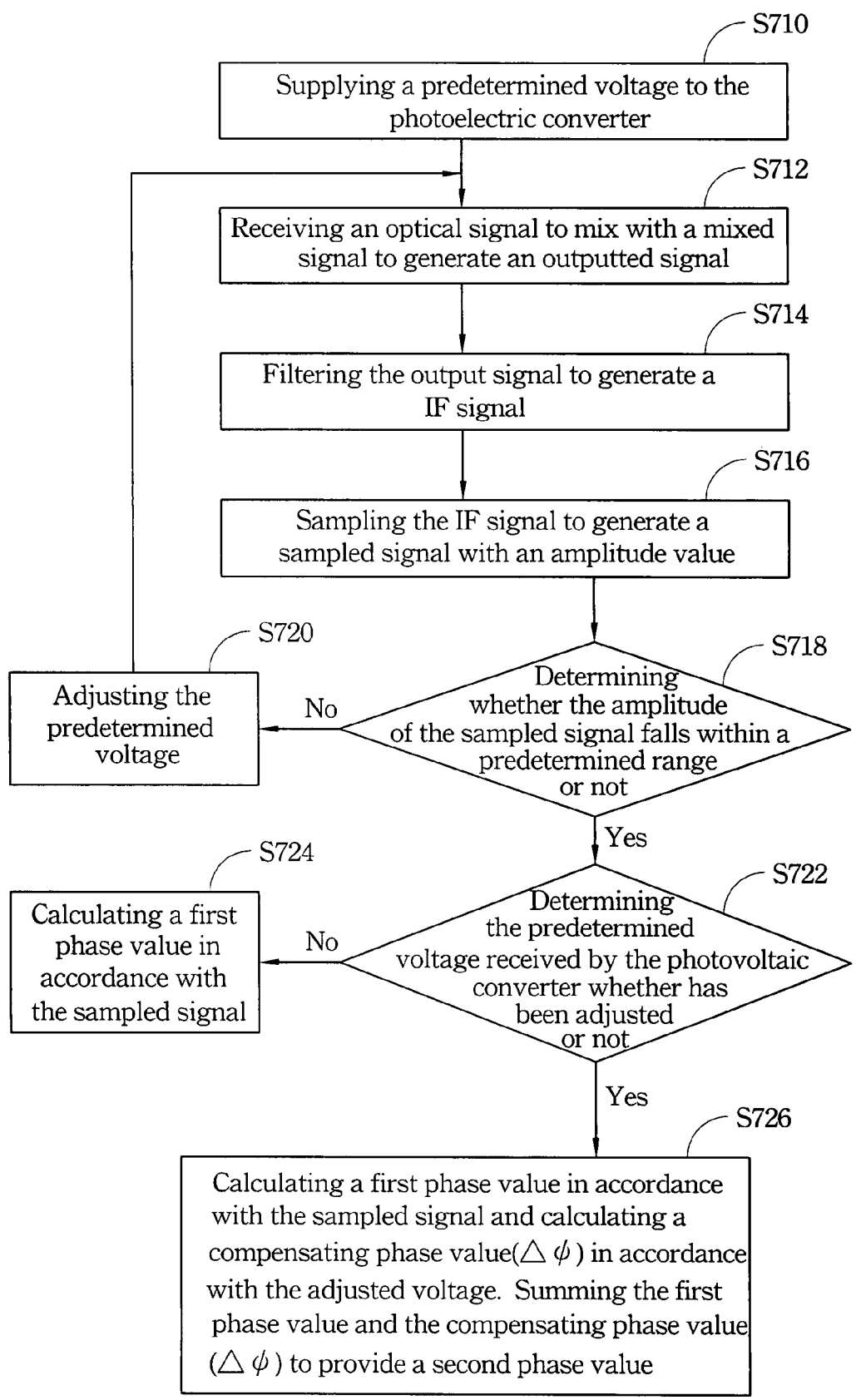
FIG. 7 is a flow chart of the phase measurement method of the present invention.

Refer to FIG. 3 and FIG. 7. FIG. 7 is a flow chart of the phase measurement method of the present invention.

In step S710, a predetermined voltage V1 is inputted to the photoelectric converter 211 to enact the photoelectric converter 211.

In step S712, an optical signal T(t) is received by the receiver 210 and converted into an electrical signal. The electrical signal is mixed with a mixed signal H(t) to generate an output signal S1. In this embodiment, the received optical signal T(t) is reflected by the object or emitted from the emitter.

In step S714, the output signal S1 is filtered by the filter 221 to generate an IF signal S2. The filter 221 is a band-pass filter which can generate the IF signal S2 with a phase value.

In step S716, the IF signal S2 is sampled by the analog-to-digital converter 223 to generate a sampled signal S3 with an amplitude value.

In step S718, the processing unit 225 determines whether the amplitude value of the sampled signal S3 falls into the predetermined amplitude range or not. In this embodiment, the predetermined amplitude range is, but not limited in, 0.3V-3.3V. Decreasing the predetermined amplitude range values increases the measurement accuracy but decreases the measurement speed.

In step S720, the processing unit 225 adjusts the predetermined voltage V1 and makes the receiver 210 re-receive the optical signal T(t) until the amplitude value of the sampled signal S3 falls within the predetermined amplitude range when the amplitude value does not fall within the predetermined amplitude range. In this way, the reverse bias of the photoelectric converter 211 is modified. Therefore, the amplitude value of the sampled signal S3 is adjusted to fall within the predetermined amplitude range by modifying the outputted voltage of the high-voltage generator 229 when the received optical signal is varied because of the ambient conditions, such as the reflection of the target object surface, the distance, the temperature, the atmosphere etc.

The processing unit 225 calculates a compensating voltage ($\Delta V$) in accordance with the voltage V1 received by the photoelectric converter 211 and the reference list LUT1, and outputs a corresponding control signal SC. Therefore, the high-voltage generator 229 modifies the voltage V1 to another voltage V1' in accordance with the control signal SC. In this embodiment, the voltage V1' is the sum of the voltage V1 and the compensating voltage ($\Delta V$).

Repeat step S712 to step S718 to generate an amplitude value of the sampled signal falling within the predetermined amplitude range. For example, the receiver 210 re-receives the optical signal T(t) to convert the optical signal into an electrical signal when the voltage V1' is supplied to the photoelectric converter 211. The electrical signal is mixed with the mixed signal H(t) to generate another output signal S1'. The output signal S1' is filtered by the filter 221 to generate an IF signal S2'. The IF signal S2' is sampled by the analog-to-digital converter 223 to generate another sampled signal S3' whose the amplitude value falls within the predetermined amplitude range.

In step S722, the processing unit 225 determines whether the voltage V1 received by the photoelectric converter 211 has been modified or not. The sample unit 227 samples the IF voltage signal to output the sampled voltage to the processing unit 225 such that the processing unit 225 can determine whether the voltage received by the photoelectric converter 211 has been modified or not. Starting with step S724 when the voltage received by the photoelectric converter 211 has not been modified, and starting with step S726 when the voltage received by the photoelectric converter 211 has been modified. In this embodiment, the voltage V1 has not been modified and the voltage V1' has been modified.

In step S724, the processing unit 225 calculates a first phase value in accordance with the sampled signal S3 and terminated without compensation.

In step S726, the processing unit 25 calculates a compensating phase value ($\Delta \phi$) in accordance with the modified voltage V1'. The processing unit 225 calculates a first phase value in accordance with the sampled signal S3' and generates a compensating phase value ($\Delta \phi$) in accordance with the reference list LUT2 and the voltage value sampled by the sample unit 227. The phase difference caused by the voltage modification is compensated to correct the phase. Therefore, the processing unit 225 calculates a second phase value by summing up the first phase value and the compensating phase value ($\Delta \phi$).

In this embodiment of the present invention, the optical signal is received by the photoelectric converter and converted into an electrical signal. The reverse bias of the photoelectric converter is modified to correct the phase in accordance with the variation between the reverse bias and the gain. Through this method, the measurement circuit calculates an accurate measurement value under variable measurement parameters.

Figure 8:
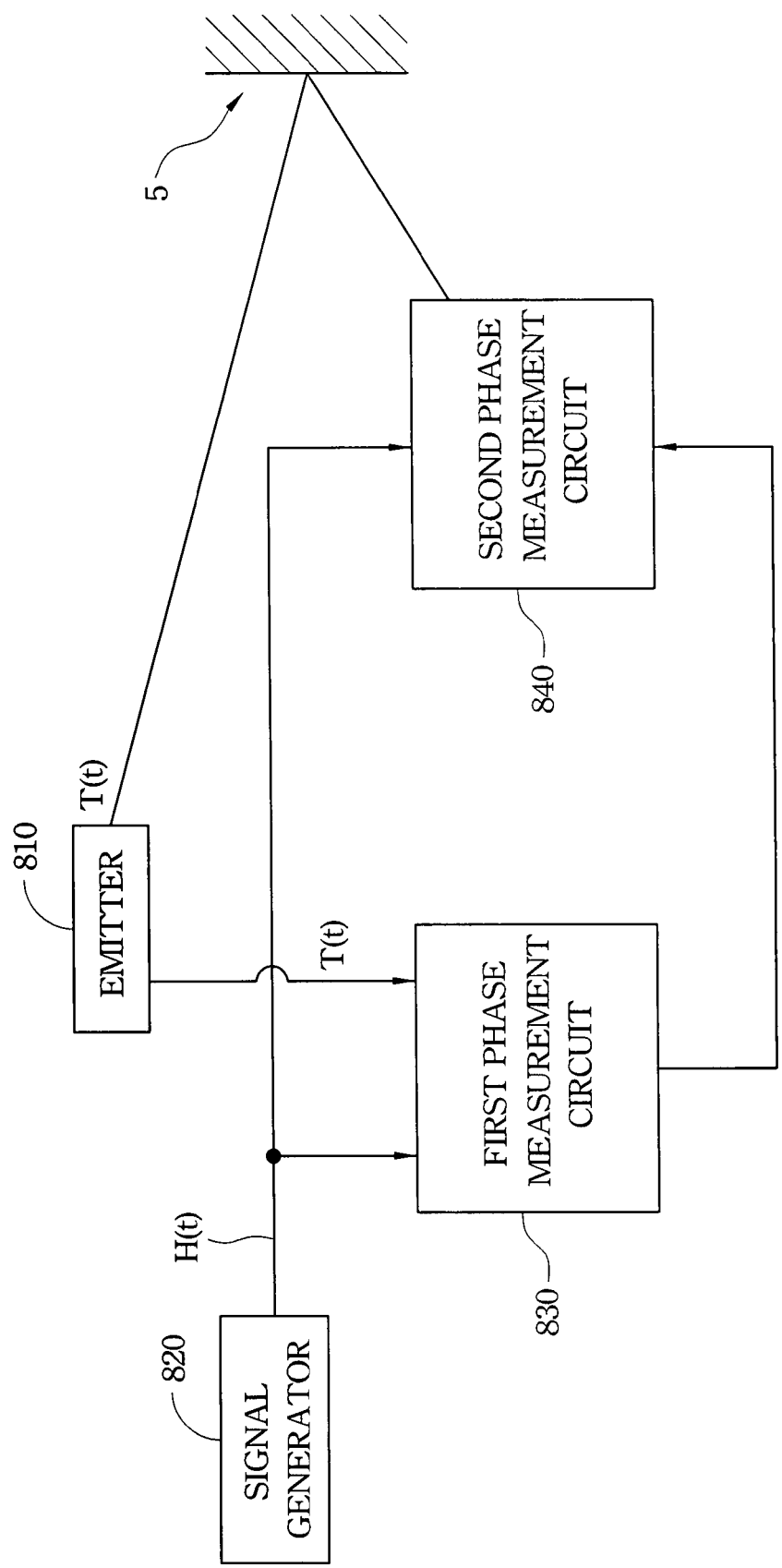
FIG. 8 is a block diagram of the embodiment of the distance measurement system.

Refer to FIG. 8. FIG. 8 is a block diagram of the embodiment illustrating the distance measurement system. The distance measurement system 800 includes an emitter 810, a signal generator 820, a first phase measurement circuit 830 and a second phase measurement circuit 840.

The emitter 810 emits an optical signal T(t) to the target object 5 and the signal generator 820 provides a mixed signal H(t). In this embodiment, the signal generator 820 is a frequency synthesizer.

The first phase measurement circuit 830 receives the optical signal T(t) from the emitter 810 to calculate a first phase value. The second measurement circuit 840 receives the optical signal reflected from the target object 5 to calculate a second phase value. Therefore, the distance between the distance measurement system 800 and the target object 5 is calculated in accordance with the difference between the first phase value and the second phase value. The phase measurement circuit 200 in FIG. 3 can be applied to one of the first phase measurement circuit 830 or the second measurement circuit 840. In this embodiment, the second measurement circuit 840 is the phase measurement circuit 200 in FIG. 3.

The second measurement circuit 840 includes a receiver 210 and a feedback calculator 220. The receiver 210 includes a photoelectric converter 211 to convert a received optical signal T(t) reflected by the target object 5 into an electrical signal. Thus, the electrical signal is mixed with the mixed signal H(t) to generate an output signal S1. The photoelectric converter 211 inputs a predetermined voltage V1 to provide an initial reverse bias. The feedback calculator 220 calculates a sampled signal S3 with an amplitude value in accordance with the output signal S1 from the receiver 210. When the amplitude value of the sampled signal S3 does not fall within the predetermined amplitude range, adjusting the predetermined voltage supplying to the photoelectric converter 211 to make the receiver 210 re-receive the optical signal T(t) reflected by the target object 5 until the amplitude value falls within the predetermined amplitude range. When the amplitude value falls within the predetermined amplitude range, calculating a third phase value. Calculating a compensating phase value ($\Delta\phi$) in accordance with whether the predetermined voltage of the photoelectric converter 211 has been modified or not to start the phase compensation.

When the predetermined voltage V1 has been modified, the processing unit 225 calculates the compensating phase value ($\Delta\phi$) in accordance with the modified voltage V1' and generates a second phase value by summing up the third phase value and the compensating phase value ($\Delta\phi$). When the predetermined voltage V1 has not been modified, the compensating phase value ($\Delta\phi$) is zero and the second phase value is the same as the third phase value.

As a result, the feedback calculator 220 calculates the distance between the measurement system 800 and the target object 5 in accordance with the phase difference between the first phase value and the second phase value. The first phase value measurement circuit 830 and the second phase value is generated by the second phase measurement circuit 840.

Although the present invention has been described in considerable detail with reference to certain preferred embodiments thereof, other embodiments are possible. Therefore, their spirit and scope of the appended claims should no be limited to the description of the preferred embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A phase measurement method, comprising:
   inputting a predetermined voltage to a photoelectric converter;
   receiving an optical signal;
   converting the optical signal into an electrical signal;
   mixing the electrical signal with a mixed signal to generate an output signal;
   filtering the output signal to generate an IF signal;
   sampling the IF signal to generate a sampled signal with an amplitude value;
   determining whether the amplitude value falls within a predetermined amplitude range or not;
   modifying the predetermined voltage and receiving the optical signal until the amplitude value falls within the predetermined amplitude range when the amplitude value does not fall within the predetermined amplitude range;
   calculating a first phase value in accordance with the sampled signal when the amplitude value falls within the predetermined amplitude range;
   determining whether the predetermined voltage has been modified or not;
   calculating a compensating phase value in accordance with the modified predetermined voltage when the predetermined voltage has been modified; and
   summing up the first phase value and the compensating phase value to generate a second phase value.

2. The phase measurement method of claim 1, wherein the step of modifying the predetermined voltage to re-receive the optical signal until the amplitude value falls within the predetermined amplitude range further comprising:
   detecting the predetermined voltage;
   calculating a compensating voltage in accordance with the predetermined voltage and a first reference list; and
   modifying the predetermined voltage in accordance with the compensating voltage.

3. The phase measurement method of claim 2, wherein the compensating phase value is calculated by the modified predetermined voltage and a second reference list.

4. The phase measurement method of claim 1, wherein filtering the output signal with a band pass method generates the IF signal.

5. The phase measurement method of claim 1, wherein the IF signal is sampled by an analog-to-digital conversion method to generate the sampled signal.

6. A phase measurement circuit, comprising:
   a receiver comprising a photoelectric converter operable to receive an optical signal and convert the optical signal into an electrical signal mixed with a mixed signal to generate an output signal wherein the photoelectric converter is supplied by a predetermined voltage; and
   a feedback calculator calculating an amplitude value in accordance with the output signal; when the amplitude value does not fall within the predetermined amplitude range, modifying the predetermined voltage to make the receiver re-receive the optical signal until the amplitude value falls within the predetermined amplitude range; when the amplitude value falls within the predetermined amplitude range, calculating a first phase value in accordance with the sampled signal and compensating the phase in accordance with whether the predetermined voltage has been modified or not.

7. The phase measurement circuit of claim 6, wherein the feedback calculator comprising:
   a filter, filtering the output signal to generate an IF signal;
   an analog-to-digital converter, sampling the IF signal to generate a sampled signal; and
   a processing unit, calculating the sampled signal with an amplitude; when the amplitude value does not fall within the predetermined amplitude range, modifying the predetermined voltage to make the receiver re-receive the optical signal until the amplitude value falls within the predetermined amplitude range; when the amplitude value falls within the predetermined amplitude range, calculating a first phase value in accordance with the sampled signal and compensating the phase in accordance with whether the predetermined voltage has been modified or not.

8. The phase measurement circuit of claim 7, wherein the feedback calculator comprises a sample unit sampling the predetermined voltage.

9. The phase measurement circuit of claim 8, further comprising a high-voltage generator to provide the voltage to the photoelectric converter wherein the processing unit calculates a compensating voltage in accordance with the predetermined voltage and a first reference list, and outputs a control signal to make the high-voltage generator modify the predetermined voltage.

10. The phase measurement circuit of claim 7, wherein the filter is a band-pass filter.

11. The phase measurement circuit of claim 6, when the amplitude value falls within the predetermined amplitude range, wherein the processing unit further comprises whether the predetermined voltage has been modified or not; calculating a compensating phase value in accordance with the modified predetermined voltage and a second reference list and summing up the first phase value and the compensating phase value to generate a second phase value when the predetermined voltage has been modified.

12. The phase measurement circuit of claim 11, wherein the compensating phase value is calculated in accordance with the modified predetermined voltage and a second reference list.

13. A distance measurement system, comprising:

an emitter, emitting a reference signal and emitting an optical signal;

a first phase measurement circuit, receiving the reference signal to calculate a first phase value; and a second phase measurement circuit, receiving the optical signal reflected from a target object to calculate a second phase value, and calculating the distance between the distance measurement system and the target object in accordance with the phase difference between the first phase value and the second phase value; wherein the second phase measurement circuit comprising:

a receiver comprising a photoelectric converter, receiving the optical signal and converting the optical signal into an electrical signal which mixes with a mixed signal to generate an output signal wherein the photoelectric converter is supplied by a predetermined voltage; and a feedback calculator, sampling the output signal to obtain a sampled signal with an amplitude value; when the amplitude value does not fall within the predetermined amplitude range, modifying the predetermined voltage to make the receiver re-receive the optical signal until the amplitude value falls within the predetermined amplitude range; when the amplitude value falls within the predetermined amplitude range, calculating a third phase value in accordance with the sampled signal and compensating the phase in accordance with whether the predetermined voltage has been modified or not.

14. The distance measurement system of claim 13, further comprising a signal generator which generates the mixed signal.

15. The distance measurement system of claim 13, wherein the feedback calculator comprising:

a filter, filtering the output signal to generate an IF signal;

an analog-to-digital converter, sampling the IF signal to generate a sampled signal; and a processing unit, calculating an amplitude value in accordance with the sampled signal; when the amplitude value does not fall within the predetermined amplitude range, modifying the predetermined voltage to make the receiver re-receive the optical signal until the amplitude value falls within the predetermined amplitude range; when the amplitude value falls within the predetermined amplitude range, calculating a third phase value in accordance with the sampled signal and compensating the phase in accordance with whether the predetermined voltage has been modified or not.

16. The distance measurement system of claim 15, wherein the feedback calculator further comprises a sample unit sampling the predetermined voltage.

17. The distance measurement system of claim 16, further comprising a high-voltage generator supplying the voltage to the photoelectric converter wherein the processing unit calculates a compensating voltage in accordance with the predetermined voltage and a first reference list, and outputs a control signal to make the high-voltage generator modify the predetermined voltage.

18. The distance measurement system of claim 15, wherein the filter is a band-pass filter.

19. The distance measurement system of claim 13, wherein the processing unit determines whether the predetermined voltage has been modified or not when the amplitude value falls within the predetermined amplitude range; calculating a compensating phase value in accordance with the modified predetermined voltage, and summing up the third phase value and the compensating phase value to generate a second phase value when the predetermined voltage has been modified; taking the third phase value as the second phase value when the predetermined voltage has not been modified.

20. The distance measurement system of claim 19, wherein the compensating phase value is calculated in accordance with the modified predetermined voltage and a second reference list.

* * * * *